United States Patent [19]

Kadner

[11] 4,362,185

[45] Dec. 7, 1982

[54] SEATING ARRANGEMENTS FOR POPPET OR NON RETURN VALVES

[76] Inventor: Max Kadner, 36 Brown St., Waverly, N.S.W., Australia, 2024

[21] Appl. No.: 263,352

[22] Filed: May 13, 1981

Related U.S. Application Data

[63] Continuation-in-part of Ser. No. 63,117, Aug. 2, 1979, abandoned.

[30] Foreign Application Priority Data

Aug. 14, 1978 [AU] Australia ............................ PD5475

[51] Int. Cl.³ ........................................... F16K 15/02
[52] U.S. Cl. .............................. 137/516.29; 137/540; 251/332; 251/DIG. 1
[58] Field of Search ...................... 137/516.29, 540; 251/DIG. 1, 332

[56] References Cited

U.S. PATENT DOCUMENTS

| | | | |
|---|---|---|---|
| 2,588,157 | 3/1952 | Olson | 137/53 |
| 2,685,296 | 8/1954 | Boosman | 137/112 |
| 2,811,979 | 11/1957 | Presnell | 137/112 |
| 2,827,922 | 3/1958 | Guinard | 137/533.21 |
| 3,200,839 | 8/1965 | Gallagher | 137/516.29 |
| 3,580,275 | 5/1971 | Hanson | 137/516.29 |
| 4,140,148 | 2/1979 | Richter | 137/240 |

FOREIGN PATENT DOCUMENTS 1447725 2/1974 United Kingdom ................ 251/332

*Primary Examiner*—Robert G. Nilson
*Attorney, Agent, or Firm*—Howson and Howson

[57] ABSTRACT

A poppet or non-return valve, in particular for high speed cycle operation, comprising a valve chamber, a valve seat and a valve member movable in the valve chamber. The valve member has a grooved button which carries an O-ring which forms an elastomeric seal. The groove is so shaped that on closing of the valve the surface of the groove does not interfere with the deformation of the O-ring.

3 Claims, 4 Drawing Figures

SEATING ARRANGEMENTS FOR POPPET OR NON RETURN VALVES

CROSS REFERENCE TO RELATED APPLICATIONS

This application is a continuation-in-part of my co-pending application, Ser. No. 63,117, filed Aug. 2, 1979, now abandoned.

BACKGROUND OF THE INVENTION

This invention relates to improvements in seating arrangements for poppet or non-return valves.

Many poppet or non-return valves as used hitherto include a dome-shaped head which registers with a correspondingly shaped seat in the valve chamber. In many cases the seating arrangement is metal to metal and because of minor variations between the valve and the seat caused by faulty fitting or wear it has been difficult to obtain a proper seating, consequently such valves leak. This gives rise to constant maintenance problems and renders such valves unsuitable in many applications in particular for high speed cycle operation.

In recent years, attempts have been made to overcome this problem by the use of valves which use an O-ring seating arrangement. The valve has been so constructed that the O-ring is connected to the valve member and seats on a shoulder in the valve chamber. Such valves have not proved entirely satisfactory for high-speed operation. The repeated compression loads on the O-ring causes deformation of the O-ring beyond the elastic limit of the material from which it is made. This has given rise to a breakdown in sealing with the necessity of frequent replacement of the O-ring.

The present invention overcomes the problems associated with the seating arrangements of such valves as encountered hitherto and at the same time provides a valve which is of simple yet robust construction and which can be used for extremely lengthy periods at high speed cycles without breakdown in the valve seating arrangements.

SUMMARY OF THE INVENTION

According to the invention there is provided a poppet valve or non-return valve including:
(i) a valve chamber,
(ii) an annular valve seat,
(iii) a valve member movable in the valve chamber and having an O-ring retainer chamber and having an O-ring retainer member projecting towards the annular valve seat, and,
(iv) an elastomeric O-ring on the retainer member to provide a seal between the valve member and the annular valve seat when the valve is in its closed position,
and wherein the O-ring retainer member has:
(v) a head portion remote from the valve member, and,
(vi) a groove between the head portion and the valve member which comprised by:
  (a) a first conical portion extending inwardly from the head portion and having a cone angle no greater than about 25°.
  (b) a second conical portion spaced inwardly from the first conical portion and having a cone angle of at least about $(90° - 2\gamma_E)$ where $\gamma_E$ is given by the formula:

$$\cot \gamma_E = \frac{\pi}{4}\left[\left(\frac{R_o}{R_o - X_1}\right)^2 + 1\right]$$

wherein
$R_o$ is the cross sectional radius of the O-ring when the valve is open, and,
$X_1$ is the reduction in cross-sectional radius of the O-ring when the valve is closed.
  (c) a curved zone between the two conical portions which provides a smooth transition therebetween the incremental value of the cone angle $(90° - 2\gamma)$ of the conical portion being given by the formula $$\cot \gamma = \frac{\pi}{4}\left(\frac{R_o}{R_o - x}\right)^2 + 1$$

wherein
$R_o$ has the above meaning and,
$x$ is the reduction in the cross-sectional radius of the O-ring at the incremental conical portion of the curved zone,
so that the O-ring retainer member does not interfere with or constrain the O-ring during its deformation sequence as the valve closes and opens.

BRIEF DESCRIPTION OF THE DRAWINGS

In order that the invention may be more readily understood and put into practical effect, reference will now be made to the accompanying drawings in which.

DESCRIPTION OF THE PREFERRED EMBODIMENT

Figure 1:
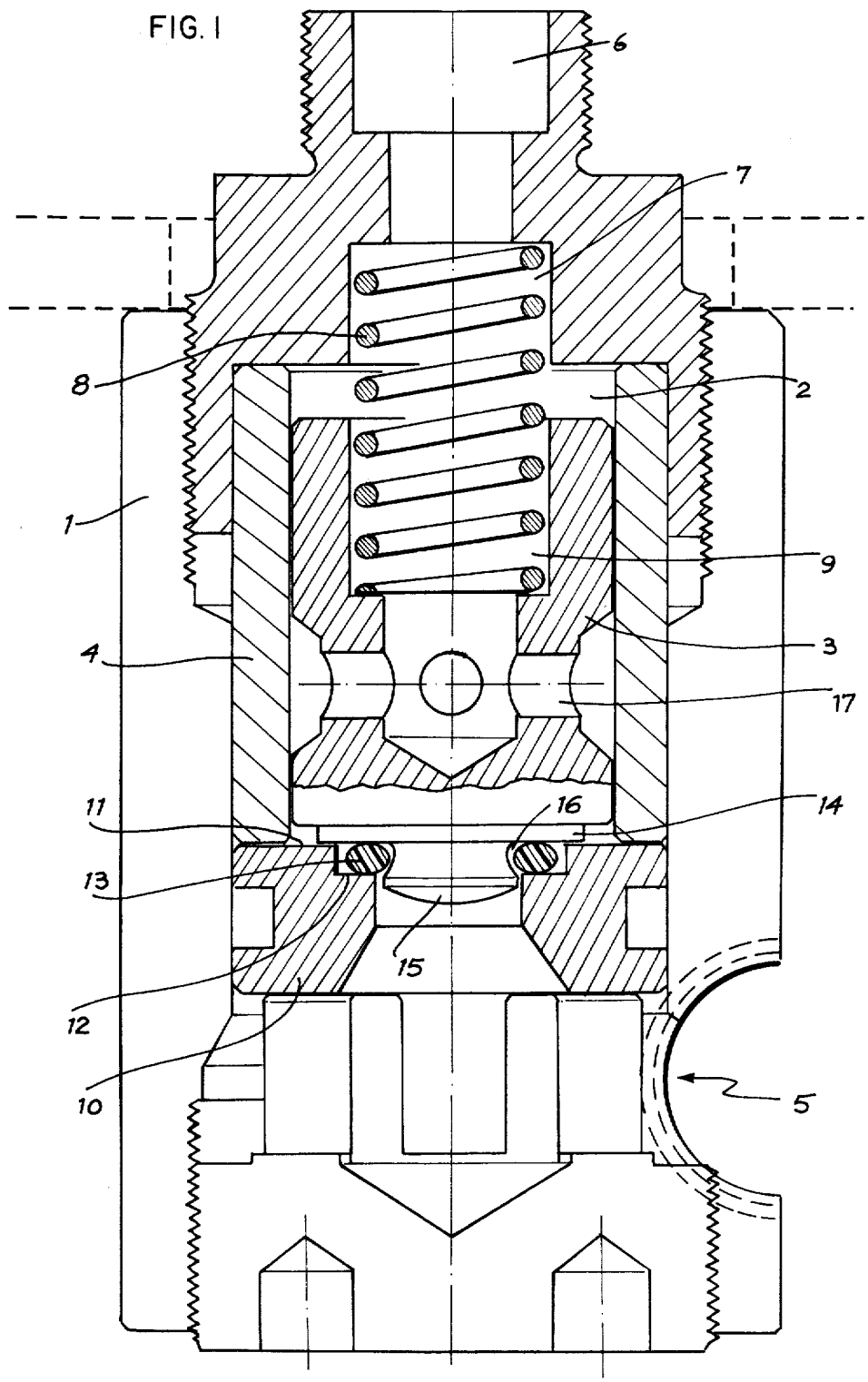
FIG. 1 is a cross sectional view of a poppet valve according to one embodiment of the invention.

Referring initially to FIG. 1, the valve comprises a valve body or housing 1 which defines a valve chamber 2. Movable in the valve chamber 2 is a valve member 3, which in the present embodiment is guided in its reciprocal movements by a guide member 4 fixed in the valve chamber 3. The valve housing 1 has in inlet 5 and an outlet 6. The latter is partly enlarged at 7 to receive one end of a compression spring 8 the other end of which engages a correspondingly enlarged portion 9 in the valve member 3.

On the inlet side, the valve chamber 2 is closed off by an annular insert 10 which forms a seat 11 for a mechanical seal as well as a seat 12 for an elastomerical seal with the valve member 3, both seats being spaced from each other.

The seats 11 and 12 are stepped inwardly and have seat surfaces extending normal to the direction of movement of the valve member 3. As can be seen the diameter of the seat 11 is greater than the diameter of the seat 12. The latter seat is wide enough to allow for the radial expansion of an O-ring 13 attached to the valve member 3 and forming part of the elastomeric seal.

The valve member has a disc-like surface 14 which co-operates with the seat 11 to form a mechanical seal under the action of the compression spring 8. Extending centrally from the surface 14 into the annular insert 10 is a button-like projection or O-ring retainer member 15 with a peripheral groove 16 supporting the O-ring 13 forming the elastomeric seal.

The valve member 3 in its rest position is held by the spring 8 with its surface 14 against the seat 11 of the insert 10. Prior to this engagement it is preferred that O-ring 13 has already engaged the seat 12 of the insert 10, so that the O-ring is slightly deformed when the surface 14 contacts seat 11. Thus a mechanical as well as an elastomeric seal are formed. The spacing between the seats 11 and 12 is selected so that the deformation of the O-ring will not exceed its elastomeric limits on closure of the valve, thus preventing any early deterioration of the elastomeric seal.

In the example shown in the drawing the valve member 3 is provided with a cross-bore 17 communicating with the valve outlet 6, but other arrangements for the fluid flow can be made as long as the valve member co-operates with the two seats in the valve chamber.

Figure 2:
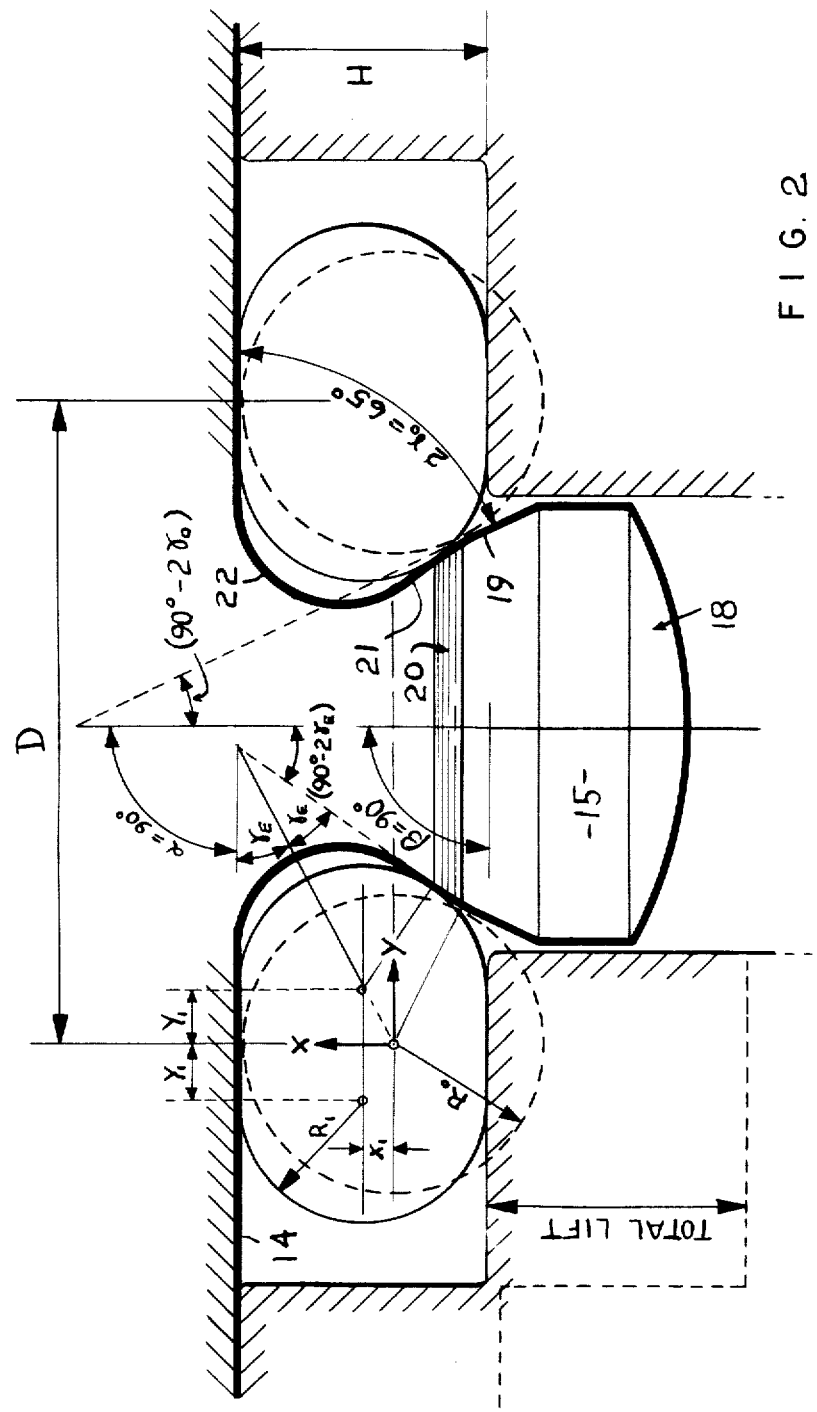
FIG. 2 is an enlarged view of the O-ring and its retainer member.

Turning now to FIG. 2, it will be seen that the angle ($\alpha$) between the plane of the seat 12 and the centre line of the button 15 is ninety degrees as is the angle ($\alpha$) between the centre line and the surface 14.

Initially the cross-section of the O-ring is circular of radius $R_o$ and at the end of the closing cycle the cross-section consists of a two semi-circular and portions of radius $R_1$ and a central rectangular portion of width $2Y_1$ and height H. As the compression of the O-ring in the X-direction is $X_1$, it follows that:

$$R_1 = R_o - X_1$$

As the button 15 is designed to ensure that it does not interfere with or constrain the O-ring during its deformation sequence, the cross-sectional area of the O-ring remains constant and thus:

$$\pi R_o^2 = \pi R_1^2 + H \cdot 2Y_1$$

or, $$\pi R_o^2 = \pi (R_o - X_1)^2 + 2(R_o - X_1) 2Y_1$$

or, in general terms for all values of x and y:

$$\pi R_o^2 = \pi (R_o - x)^2 + 4(R_o - x)y \quad \text{(A)}$$

i.e. $4(R_o - x)y = \pi R_o^2 - \pi (R_o - x)^2$ or $$y = \frac{\pi}{4} \left[ \left( \frac{R_o^2}{R_o - x} \right) - (R_o - x) \right] \quad \text{(B)}$$

Equation B is the equation of the y co-ordinate of the consecutive radius centres as the radius moves from the initial value of $R_o$ to the final value of $R_1$.

As can be seen in FIG. 2, the button 15 has a head portion 18, a first tapered portion 19, a curved zone 20, a second tapered portion 21 and a base portion 22 clear of the deformed O-ring. The cone angle of the portion 19 may be expressed as $(90° - \gamma_0)$ (see right hand side of FIG. 2) and the cone angle of the portion 21 as $(90° - 2\gamma_E)$ (see left hand side of FIG. 2).

Figure 3:
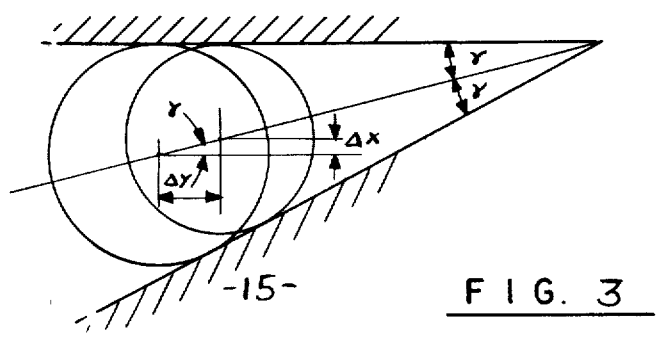
FIG. 3 is a diagramatic view of a elemental portion of the O-ring in two positions of engagement with the retainer member.

The curved zone 20 is a smooth transition between the tapered portions 19 and 21 and the incremental value of the angle $\gamma$ of each increment of the curved zone may be determined from the expression;

$$\cot \gamma = dy/dx \quad \text{(C)}$$

because at each increment the button is at a tangent to the O-ring (see FIG. 3).

Combining equation B and C we obtain the following relationship:

$$\cot \gamma = \frac{\pi}{4} \left[ \left( \frac{R_o}{R_o - x} \right)^2 + 1 \right] \quad \text{(D)}$$

which is the equation of the shape of the curved zone 20.

When $x = X_o$, that is when the O-ring is undeformed, it follows that;

$$\cot \gamma_o = \pi/4$$

$$2\gamma_o = 65°$$

which means that the slope $\gamma_o$ of the tapered portion 19 is independent of size of the O-ring. Thus, the cone angle of tapered portion should not be greater than 25°.

The angle $2\gamma_E$ is dependant upon the size of the O-ring but the spread of values is not large for the commonly available range of O-rings having a cross-sectional radius of from 0.070 inches to 0.275 inches as can be seen from the following table wherein $R_o - x_1$ is the cross-sectional radius of the O-ring at maximum compression and $\gamma_E$ is derives from equation D above:

| $R_o$ | 0.070" | 0.103" | 0.139" | 0.210" | 0.275" |
|---|---|---|---|---|---|
| $R_o - X_1$ | 0.056" | 0.086" | 0.115" | 0.175" | 0.236" |
| $2\gamma_E$ | 52.84° | 55.22° | 54.71° | 55.11° | 56.74° |

Thus, in providing commercial embodiments of the invention a manufacturer need only possess a common tool for the formation of the outer conical surface 19 and tool for the curved zone 20 and inner conical surface 21 that is appropriate for the size of O-ring.

Figure 4:
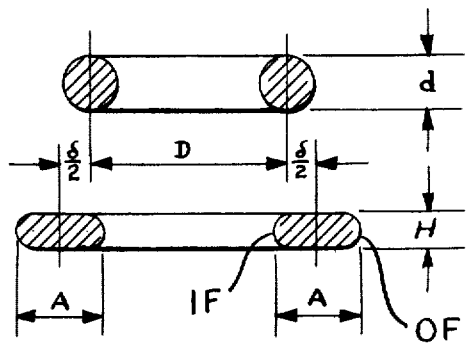
FIG. 4 is a cross-sectional view of an O-ring in its free and its compressed state.

The life of the O-ring may be further extended by pre-stressing the O-ring to prevent scuffing on the valve seat faces. FIG. 4 shows a conventional O-ring in a free and compressed state where:

D is the centre to centre diameter of the free O-ring
d is the cross-sectional diameter of the free O-ring
A is the compressed width of the O-ring
H is the compressed height of the O-ring
$\delta/2$ is the shift in the centre of cross-section from the free to the compressed state
$L_o$ is nominal diameter of the free O-ring To avoid scuffing the tension stretch on the outer fibres OF must be equal and opposite to the compression squeeze on the inner fibres IF. The tension stretch and compression squeeze is given by:

$$\frac{\text{change of length}}{\text{initial length}}$$

and from FIG. 4 it follows that:

$$\text{Tension stretch} = \frac{(D + \delta + A) - (D + d)}{(D + d)}$$

$$= \frac{\delta + A - d}{D + d}$$

$$\text{Compression squeeze} = \frac{(D + \delta - A) - (D - d)}{(D - d)}$$

$$= \frac{\delta - A + d}{D - d}$$

Thus, scuffing will not occur if:

$$\frac{\delta + A - d}{D + d} + \frac{\delta - A + d}{D - d} = 0 \quad (E)$$

i.e. $(D - d)(\delta + A - d) = (D + d)(-\delta + A - d)$
i.e. $D\delta + AD - dD - d\delta + dA + d^2 =$
$\qquad -D\delta + AD - dD - d\delta + Ad - d^2$
i.e. $2\delta D = 2Ad + -2d^2$
i.e. $\delta D = d(A - d)$
i.e. $\delta = d/D(A - d)$ With reference to FIG. 2, scuffing is avoided if the button is so dimensioned that when the O-ring is positioned thereon the centre to centre diameter is enlarged by the pre-stressing dimension δ which is derived from quation E for each specific O-ring.

Valves constructed in accordance with the present invention have provided under test to be extremely reliable and satisfactory for repeated operation at high speed cycles without breakdown.

It will be appreciated that the foregoing description relates to a preferred embodiment of the invention only and many modifications of the invention are possible without departing from the spirit and scope of the present invention.

What is claimed is:

1. A poppet valve or non-return valve including:
   (i) a valve chamber,
   (ii) an annular valve seat,
   (iii) a valve member movable in the valve chamber and having an O-ring retainer chamber and having an O-ring retainer member projecting towards the annular valve seat, and
   (iv) an elastomeric O-ring on the retainer member to provide a seal between the valve member and the annular valve seat when the valve is in its closed position,
and wherein the O-ring retainer member has:
   (v) a head portion remote from the valve member, and,
   (vi) a groove between the head portion and the valve member which comprised by:
   (a) a first conical portion extending inwardly from the head portion and having a cone angle no greater than about 25°.
   (b) a second conical portion spaced inwardly from the first conical portion and having a cone angle of at least about $(90-2\gamma_E)$ where $\gamma_E$ is given by the formula:

$$\cot \gamma_E = \frac{\pi}{4}\left[\left(\frac{R_o}{R_o - x_1}\right)^2 + 1\right]$$

wherein $R_o$ is the cross sectional radius of the O-ring when the valve is open, and, $X_1$ is the reduction in cross-sectional radius of the O ring when the valve is closed.

(c) a curved zone between the two conical portions which provides a smooth transition therebetween, the incremental value of the angle $(90° - 2\gamma_E)$ of the curved zone being given by the formula $$\cot \gamma = \frac{\pi}{4}\left[\left(\frac{R_o}{R_o - X}\right)^2 + 1\right]$$

wherein $R_o$ has the above meaning and,

X is the reduction in the cross-sectional radius of the O-ring at the incremental conical portion of the curved zone so that the O-ring retainer member does not interfere with or constrain the O-ring during its deformation sequence as the valve closes and opens.

2. A poppet valve is claimed in claim 1 wherein the O-ring retainer is so shaped that when the O-ring is positioned thereon it is pre-stressed by enlarging the centre to centre diameter of the O-ring by an amount δ where δ is given by the formula:

$$\delta = d/D(A - d)$$

where d is the cross-sectional diameter of the free O-ring,

D is the centre to centre diameter of the free O-ring, and,

A is compressed width of the O-ring.

3. A poppet valve as claimed in claim 1 wherein the valve member and the valve seat also provide a mechanical seal therebetween of annular configuration, the diameter of that annulus being larger than the diameter of the elastomeric seal annulus.

* * * * *